(12) United States Patent
Barmatov et al.

(10) Patent No.: US 7,806,181 B2
(45) Date of Patent: Oct. 5, 2010

(54) TECHNIQUE TO LIMIT PROPPANT CARRY-OVER OUT OF FRACTURE

(75) Inventors: Evgeny Borisovich Barmatov, Sipachi (RU); Dmitry Isaakovich Eskin, Novosibirsk (RU); Denis Vsevolodovich Ivanov, Samara (RU); Konstantin Mikhaylovich Lyapunov, Novosibirsk (RU); Matthew J. Miller, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 2 days.

(21) Appl. No.: 11/942,304

(22) Filed: Nov. 19, 2007

(65) Prior Publication Data

US 2008/0115936 A1 May 22, 2008

(30) Foreign Application Priority Data

Nov. 20, 2006 (RU) .............................. 2006140858

(51) Int. Cl.
*E21B 43/267* (2006.01)
(52) U.S. Cl. ................. 166/280.2; 166/308.1
(58) Field of Classification Search ........................ None
See application file for complete search history.

(56) References Cited

U.S. PATENT DOCUMENTS

| | | | |
|---|---|---|---|
| 5,218,038 A | 6/1993 | Johnson | |
| 5,330,005 A | 7/1994 | Card | |
| 5,501,274 A | 3/1996 | Nguyen | |
| 5,582,249 A | 12/1996 | Caveny | |
| 5,697,440 A | 12/1997 | Weaver | |
| 5,908,073 A | 6/1999 | Nguyen | |
| 6,059,034 A * | 5/2000 | Rickards et al. | 166/280.2 |
| 6,209,643 B1 | 4/2001 | Nguyen | |
| 6,330,916 B1 | 12/2001 | Rickards | |
| 6,830,105 B2 | 12/2004 | Thesing | |
| 7,032,667 B2 | 4/2006 | Nguyen | |
| 2004/0188089 A1* | 9/2004 | Nguyen | 166/280.1 |
| 2005/0006095 A1* | 1/2005 | Justus et al. | 166/295 |
| 2005/0082062 A1* | 4/2005 | Webber et al. | 166/280.1 |
| 2006/0192039 A1* | 8/2006 | Smith | 241/24.1 |

* cited by examiner

*Primary Examiner*—Zakiya W. Bates
(74) *Attorney, Agent, or Firm*—David Cate; Robin Nava; Jeff Griffin

(57) ABSTRACT

The invention relates to methods to stimulate formation production when oil recovering. Reducing cost and simplifying the manufacture of the propping material to prevent proppant carrying-over were achieved owing to the injection of the hydraulic fracturing liquid with a propping agent containing a propping material as randomly cut particles of the polymers reworked and being in irregular shapes with the maximum-to minimum size ratio more than 5. A propping material should be a material being resistant to hydraulic fracturing liquid, oil, gas condensate and oil-containing liquids, and salt water in the range of temperatures 40 to 140° C., plastic within pressure range of 7 atm to 700 atm, and having Young's modulus within 100 MPa to 20000 MPa. The propping material thickness can be within 10 to 500 micrometers. The propping material can be of flake-like, lamellar, and chip-like shapes or their mixture. The propping material content of the propping agent should be 0.1 to 30% by weight of the total propping agent mixture with the propping material. The propping material should be used for the hydraulic fracturing phase or at the end propping phase combined with portion of 10 to 50% of the total weight of the propping agent with the propping material.

15 Claims, No Drawings

TECHNIQUE TO LIMIT PROPPANT CARRY-OVER OUT OF FRACTURE

This application claims foreign priority benefits to Russian Patent Application No. 2006140858, filed on Nov. 20, 2006.

BACKGROUND

The statements in this section merely provide background information related to the present disclosure and may not constitute prior art.

The invention deals with a petroleum scope, particularly, techniques to stimulate formation production when oil recovering.

A severe problem in oil recovery is proppant carrying-over out of a fracture into a borehole upon hydraulic fracturing, both when primary cleaning and in some instances even upon well completion. In practice, up to 20% of proppant can be carried-over into a borehole, which poses serious threats, such as mentioned below. With low-yield wells, the proppant will be deposited in casings, which calls for intermittent flushing and results in repair procedure appreciation too. Another effect of carrying-over the unfixed proppant or grits should be early wear and breakdown of in-the-hole electric centrifugal pumps. The decrease should be observed in oil or gas recovery due to significant borehole area transmissibility because of fracture thickness reduction or production zone bridging.

Some techniques are known to markedly reduce the carrying-over proppant or other propping agents out of the fracture.

The most popular approach uses a solidified resin-coated proppant to be injected into the fracture at the end of treatment. However, this proppant is of limited application due to adverse chemical reaction of the resin coating and the hydraulic fracturing liquid. On the one hand, this interaction will cause partial coating degradation and integrity breaking, which reduces the proppant particle contacts and, therefore, the proppant packing strength. On the other hand, the reaction of the resin coating components and the hydraulic fracturing liquid components will lead to uncontrolled variation in the Theological liquid characteristics, which decreases hydraulic fracturing efficiency. Factors above and intermittent cyclic loads due to the borehole closing and development, and long period of the borehole closing could materially reduce the proppant packing strength.

A technique is known wherein to limit the formation-situated proppant carrying-over a fiber material mixed with the propping agent material should be added; thus, the fibers will interlock the proppant particles, which gives them higher strength and, therefore, limits back proppant carrying-over. Moreover, with fiber added, the loads will be shifted more effective and extra bridges will be across the significant proppant packing area. A fiber structure is more flexible as compared to the vulcanized resin proppant, therefore, movements will be admissible for a fiber-proppant packing without loss of strength.

A technique is known wherein the use of the bundles of fibers comprised about 5-200 individual fibers of 0.8-2.5 mm in length and approximately 10-1000 micrometers in diameter keeps from proppant carrying-over out of the borehole. With this, the structure of the fiber bundles is one-side fixed.

A technique is known of mixing proppant and strained material as bead-shaped particles. In doing so, the particles strained are made of polymer. The polymer particles strained can be of various shapes, such as oval, wedge, cubic, rodlike, cylindrical, and conic ones, however, the maximum length-to-base ratio being less or equal to 5. In case of strained materials of cone diameters and for aluminum particles, the maximum length-to-base ratio should be less or equal to 25. The particles strained can also be sphere-shaped plastic beads or composite particles containing undistorted cores and strained coatings. Usually, the volume of the undistorted core constitutes approximately 50-95% vol. of total particle and can be quartz, crystobalite, graphite, gypsum or talc. With another version (U.S. Pat. No. 6,330,916), a core consists of the materials strained and can comprise ground or sized materials, such as nutshell, seed shell, fruit kernels, and timber surfaced.

To fix and limit propping agent carrying-over the mixture of proppant and adhesive polymer materials can be used. Adhesive compounds will come into mechanical contact with propping agent particles, cover them and coat them with a thin adhered layer. As a result, particles will adhere with each other, as well as with sand or sized propping agent fragments; which stops to great extent or in full the grit carrying-over out of the fracture. A peculiar feature of the adhesive compounds is an adhesive property at higher subsurface temperatures for a long time without cross-linking or curing.

The adhesive materials can match other chemical agents used in hydraulic fracturing, such as, inhibitors, antimicrobial agents, polymer gel decomposers, and paraffin and corrosion inhibitors.

A technique is known of fracture propping using adhesive agents and resin proppants. U.S. Pat. No. 6,742,590 has disclosed a technique of fracture protection against carrying-over a proppant in the mixture of adhesive materials and strained particles being themselves effective additives to prevent the proppant carrying-over.

Another type of material used to prevent the proppant carrying-over is thermoplastic material. Thermoplastics mixed with a propping agent can soften at high rock temperatures and further adhere it formed a bonded aggregates with great of proppant amount.

A technique is known of using thermoplastics mixed with resin proppant. In some techniques, a thermoplastic material will mix with a proppant as liquid or solution in a suitable solvent. With this, an elastomer-forming compound can cure formed a thermoplastic material by itself or under special extra agents.

There remains a need to further prevent of the proppant carrying-over with improved production cost and manufacturing requirements. This need is met, at least in part, with the following invention.

SUMMARY OF THE INVENTION

The invention deals with a petroleum scope, particularly, techniques to stimulate formation production when oil recovering. Embodiments of the invention are methods uses reworked materials, which reduces cost and facilitates the manufacture of a propping material which helps prevent proppant carrying-over.

In one aspect, the invention relates to methods to limit proppant carry-over out of the fracture, by injecting hydraulic fracturing liquid containing a propping agent, which includes a propping material, into a wellbore penetrating the formation The propping material comprises randomly cut particles of reworked polymers which have irregular shapes, and where the maximum-to minimum size ratio of the polymers is more than about 5.

In another aspect, disclosed are subterranean formation treatment methods where a hydraulic fracturing liquid containing a propping agent comprised of a propping material is introduced into the formation. The propping material comprises randomly cut particles of reworked polymers which have irregular shapes, and where the maximum-to minimum size ratio of the polymers is more than about 5.

In yet another aspect, the invention is a method of treating a subterranean formation which includes preparing a fluid containing a propping agent having a propping material containing randomly cut particles of reworked polymers with irregular shapes and maximum-to minimum size ratio of the polymers of more than about 5; introducing the fluid into a wellbore penetrating a subterranean formation; and contacting the formation with the fluid.

DETAILED DESCRIPTION OF THE INVENTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

A purpose of the claimed invention is to use reworked materials, which reduces cost and facilitates the manufacture of a propping material which helps prevent proppant carrying-over.

In accordance with the invention, randomly cut particles of a polymer material, which may be reworked, and have a shape with length-to-width ratio more than about 5, are incorporated as propping materials into a propping agent composition. Preferred propping materials are hydraulic fracturing liquid-resistant, since the fracturing liquid contains, at least, alkali hydroxides, gelling agents as high-molecular compounds, oxidizers, surface-active agents, high-temperature stabilizers, cross-linking agents, and polymer decomposers.

The propping material is preferably resistant to oil, gas condensate and oil-containing liquids, and salt water in the range of temperatures from approximately 40 to approximately 140° C.

The propping material may also be strained within pressure range of approximately 7 atmospheres to approximately 700 atmospheres, and thus may be required to withstand such pressures.

The propping material of choice of the claimed technique should preferably have Young's modulus within 100 MPa to 20000 MPa.

The propping material thickness may be within approximately 10 to approximately 500 micrometers.

The propping material can be of various irregular shapes, such as, flake-like, lamellar, and chip-like or their mixtures.

Combined with portion of 10 to 50% of the proppant weight the propping material of the claimed technique can be used for the hydraulic fracturing phase or only at the end propping phase. In both cases, the propping material of the proppant can vary within 0.1 to 30% by weight of the total fracture proppant mixture.

In principle, the propping material may be a one-layer material formed of a polymer, a copolymer, and a homogeneous or a heterogeneous mixture of the two or more polymers. Therefore, to improve miscibility of the two or more various propping materials the polymers can be used containing functional groups of noncovalent interactions on the hydrogen bonding or the Coulomb interaction principle.

The addition of the polymer particles of the propping material to the proppant may keep the latter from being carried-over out of the fracture when a borehole developed, cleaned, flushed or acid treated and when a borehole performed under production conditions. The technique efficiency results from the mechanical linking formed inside the proppant pack through the partial proppant embedment into a propping agent and increase in rolling friction between the proppant particles. On the other hand, the use of the propping material as randomly cut particles being in shape with the length-to-width ratio more than 5 allows the increase in propping agent transmissibility, the decrease in propping agent brittleness and, therefore, the increase in well production and trouble-free service due to improving the proppant pack stability in a fracture under alternate formation pressure.

The following examples are presented to illustrate the preparation and properties of energized aqueous fluids comprising heteropolysaccharides and a surfactant, and should not be construed to limit the scope of the invention, unless otherwise expressly indicated in the appended claims. All percentages, concentrations, ratios, parts, etc. are by weight unless otherwise noted or apparent from the context of their use.

EXAMPLE

Experiments as to the proppant carrying-over and the pack strength were conducted using an installation consisting of a cell being an opaque Hastelloy container of 12×12 mm and a 10 mm-slot width wherein the test specimen was placed and water was flushed. A water flushing system was a closed loop consisting of a water pump of 100 l/min with a flow adjustment feature, a computer-related flow meter, a reduction valve, and a sediment pan. An operator adjusted water flow by hand according to the flow meter readings.

The experiments were conducted using an installation being under the axial hydraulic press-generated force. To collect the proppant washed out of the cell a system was used that consisted of a gravity filter complete with several cells for sequential sampling. The system was computer-controlled.

Control and data acquisition were on computer-generated commands. Using the system, the experiments were conducted and the proppant pack was tested by increase in flow velocity to critical value of the pack failure.

In the experiment, a propping agent as a 12/18-mesh proppant uniformly mixed with the hydraulic fracturing liquid and the reworked polymer taken in 5% mass to the proppant weight. The polymer thickness was 250 micrometers at the length average 3.2 mm. The particles were obtained by cutting a polymer film with an impeller breaker mill and were a mixture of the flakelike, lamellar, and chip-like shapes. For comparison purpose, a blank experiment was conducted using a 12/18-mesh proppant. The mixture obtained was placed between two Ohio sandstone slabs into a device to measure proppant pack strength and routine tested. To do this, a 40 MPa-closing stress was applied to the cell. Further, the cell was heated to a temperature of 90° C. and warmed-up at the temperature mentioned for 5 hours under constant water flow of 100 ml/min to final hydraulic fracturing liquid failure. To determine the proppant pack strength the 90° C.-heated water portion containing 2% KCl was flowed through the cell. The water flow was evenly increased to final pack failure. The proppant pack failure was recorded by abrupt pressure drop using differential pressure gauge data, and by proppant precipitation in the gravity filter. Measurement results showed that the strength of the polymer particle-proppant pack was 124±15 times higher as compared to that of the pure proppant.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of hydraulic fracturing comprising injecting a fracturing fluid and propping material into a borehole, the propping material comprising polymer particles consisting of reworked polymer disposed in a single layer.

2. The method of claim 1 wherein the polymers particles have an irregular shape.

3. The method of claim 1 wherein the maximum-to minimum size ratio of the polymers particles is greater than 5.

4. The method of claim 1, wherein the propping material is plastic within the pressure range of 7 atm to 700 atm.

5. The method of claim 1, wherein the propping material has Young's modulus within 100 MPa to 20000 MPa.

6. The method of claim 1, wherein the polymer particles are at least of a flake-like shape, a lamellar shape, and chip-like shape.

7. The method of claim 1, wherein the thickness of the propping material is between 10 to 500 micrometers.

8. A method of hydraulic fracturing comprising injecting a fracturing fluid into a borehole, the fracturing fluid including a propping material comprising proppant and propping agent, wherein the propping agent consists of reworked polymer particles.

9. The method of claim 8, further comprising placing the proppant material into a fracture.

10. The method of claim 9, further comprising mechanical linking of the proppant with the propping agent.

11. The method of claim 9, wherein the propping agent reduces carry-over of the proppant from the fracture.

12. The method of claim 8, wherein the propping agent is 0.1 to 30% by weight of the total propping material.

13. The method of claim 8, wherein the propping agent is 10 to 50% by weight of the total propping material, provided at the end of the propping phase.

14. The method of claim 8, wherein the propping agent has at least of a flake-like shape, a lamellar shape, and chip-like shape.

15. The method of claim 14, wherein the propping agent is a single layer material.

* * * * *